(12) United States Patent
Patil et al.

(10) Patent No.: US 10,015,208 B2
(45) Date of Patent: Jul. 3, 2018

(54) SINGLE PROXIES IN SECURE COMMUNICATION USING SERVICE FUNCTION CHAINING

(71) Applicant: Cisco Technology, Inc., San Jose, CA (US)

(72) Inventors: Prashanth Patil, Bangalore (IN); Tirumaleswar Reddy, Bangalore (IN); Daniel G. Wing, San Jose, CA (US); James Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 14/734,164

(22) Filed: Jun. 9, 2015

(65) Prior Publication Data

US 2016/0366191 A1 Dec. 15, 2016

(51) Int. Cl.
*G06F 13/00* (2006.01)
*H04L 29/06* (2006.01)
*H04L 29/08* (2006.01)

(52) U.S. Cl.
CPC ...... *H04L 65/1069* (2013.01); *H04L 63/0281* (2013.01); *H04L 63/0471* (2013.01); *H04L 63/166* (2013.01); *H04L 67/141* (2013.01); *H04L 67/28* (2013.01)

(58) Field of Classification Search
CPC ..... H04L 67/42; H04L 63/0428; H04L 67/28; H04L 65/1069; H04L 63/166; H04L 67/141; H04L 63/0281; H04L 63/0471
USPC ................ 709/220–222, 203, 227, 228, 238, 709/241–244
See application file for complete search history.

(56) References Cited

U.S. PATENT DOCUMENTS

| 6,584,567 | B1 | 6/2003 | Bellwood et al. |
| 7,353,380 | B2 | 4/2008 | VanHeyningen |
| 7,860,100 | B2* | 12/2010 | Khalid ................ H04L 41/5003 370/229 |
| 8,745,379 | B2 | 6/2014 | Orsini et al. |
| 9,467,370 | B2* | 10/2016 | Bitar ....................... H04L 45/74 |
| 9,485,192 | B2* | 11/2016 | Antich .................. H04L 45/507 |
| 2010/0080226 | A1* | 4/2010 | Khalid ................ H04L 41/5003 370/392 |

(Continued)

OTHER PUBLICATIONS

J. Guichard et al., "Network Service Header (NSH) Context Header Allocation (Data Center)", Internet-Draft Memo, Dec. 17, 2014, 8 pages.

(Continued)

*Primary Examiner* — Kenneth R Coulter
(74) *Attorney, Agent, or Firm* — Edell, Shapiro & Finnan, LLC

(57) ABSTRACT

A first service node receives a message configured to set up a secure communication session between a client and a server, in which the first service node acts as a proxy. Data packets in the secure communication session are subject to multiple service functions that require decryption of the data packets. A service function chain assigns a service node to each of the service functions. A service header is generated including metadata instructing the service nodes other than the first service node not to act as proxies in the secure communication session. The message and the service header are transmitted to a second service node in the service function chain.

20 Claims, 6 Drawing Sheets

(56) References Cited

U.S. PATENT DOCUMENTS

| | | |
|---|---|---|
| 2013/0198509 A1 | 8/2013 | Buruganahalli et al. |
| 2014/0136834 A1 | 5/2014 | Sherkin et al. |
| 2015/0271102 A1* | 9/2015 | Antich .................. H04L 45/507 370/230 |
| 2015/0281063 A1* | 10/2015 | Bitar ....................... H04L 45/74 370/392 |
| 2015/0319089 A1* | 11/2015 | Liu ....................... H04L 45/745 370/392 |
| 2015/0381478 A1* | 12/2015 | Zhang .................. H04L 45/306 370/392 |
| 2016/0028640 A1* | 1/2016 | Zhang .................. H04L 45/306 370/389 |

OTHER PUBLICATIONS

J. Halpern, et al., "Service Function Chaining (SFC) Architecture", Internet-Draft Memo, Feb. 17, 2015, 27 pages.

D. McGrew, et al., "TLS Proxy Server Extension", Internet-Draft Memo, Jul. 16, 2012, 18 pages.

\* cited by examiner

SINGLE PROXIES IN SECURE COMMUNICATION USING SERVICE FUNCTION CHAINING

TECHNICAL FIELD

Background

The present disclosure relates to secure communication sessions through intermediary network devices.

In a session between an endpoint client and an endpoint server secured with the Transport Layer Security (TLS) protocol, one or more network devices may act on the traffic in the session to provide a service (e.g., firewall, intrusion detection/prevention system, traffic compression, etc.). The service node (e.g., network device) will typically interpose itself into the secure TLS session and create two separate TLS sessions by acting as a proxy server for the endpoint client and as a proxy client for the endpoint server.

If more than one service is scheduled to be performed on the traffic in the secure session, a service function chain may be created that describes a sequence of service nodes (e.g., network devices) that are capable of performing one or more of the service functions. Typically, each service node in the service function chain will act as a proxy in the TLS session, breaking the single TLS session into a number of TLS sessions that increases as the number of services grows.

DESCRIPTION OF EXAMPLE EMBODIMENTS

Overview

A first service node among a plurality of service nodes receives a message configured to set up a secure communication session between a client and a server, in which the first service node acts as a proxy. Data packets in the secure communication session are subject to a plurality of service functions. A service chain is determined to comprise an assignment of at least one of the plurality of service nodes to each of the plurality of service functions. A first service header is generated comprising metadata indicating that the service nodes other than the first service node will not act as proxies in the secure communication session. The message and the first service header are transmitted to a second service node in the service chain.

Example Embodiments

In a secure network environment, a significant amount of traffic is encrypted in accordance with the Transport Layer Security (TLS) protocol, for example, using Hypertext Transport Protocol Secure (HTTPS) messages. Decrypting and re-encrypting TLS at every service node that may need to examine that traffic may become expensive and unwieldy in terms of processing cost, operational costs (e.g., debugging/troubleshooting breakages), and prone to breakage with certificate validation across multiple hops.

Data center operators typically deploy a variety of Layer 4 through Layer 7 service functions in physical and/or virtual form factors. A large amount of traffic transiting an Intercloud service or data center may be subject to treatment by multiple service functions (e.g., firewall service, distributed denial of service (DDOS) protection, intrusion detection/prevention service (IDS/IPS), traffic optimizers, compression services, advertisement insertion, etc.). Treating network traffic with multiple services may require each service function to operate on the traffic independently and access the payload of the packets in the traffic independently. Classification data from one service function may be useful to subsequent service functions (e.g., firewall services and IDS/IPS may overlap). However, some service functions may require access to completely different data from the traffic (e.g., firewall services and traffic compression services typically have no overlap).

The techniques presented herein provide for the first service node in the service chain to act as an HTTPS proxy, breaking the TLS session between a client and a server into two TLS sessions. This enables the proxy to access the payload of the traffic in the session and act on the traffic with a service function. The first service node then securely conveys any necessary keys with a network service header to any subsequent service nodes. Each service node that needs to operate on the traffic will use these keys to decrypt the payload and provide its service.

Figure 1:
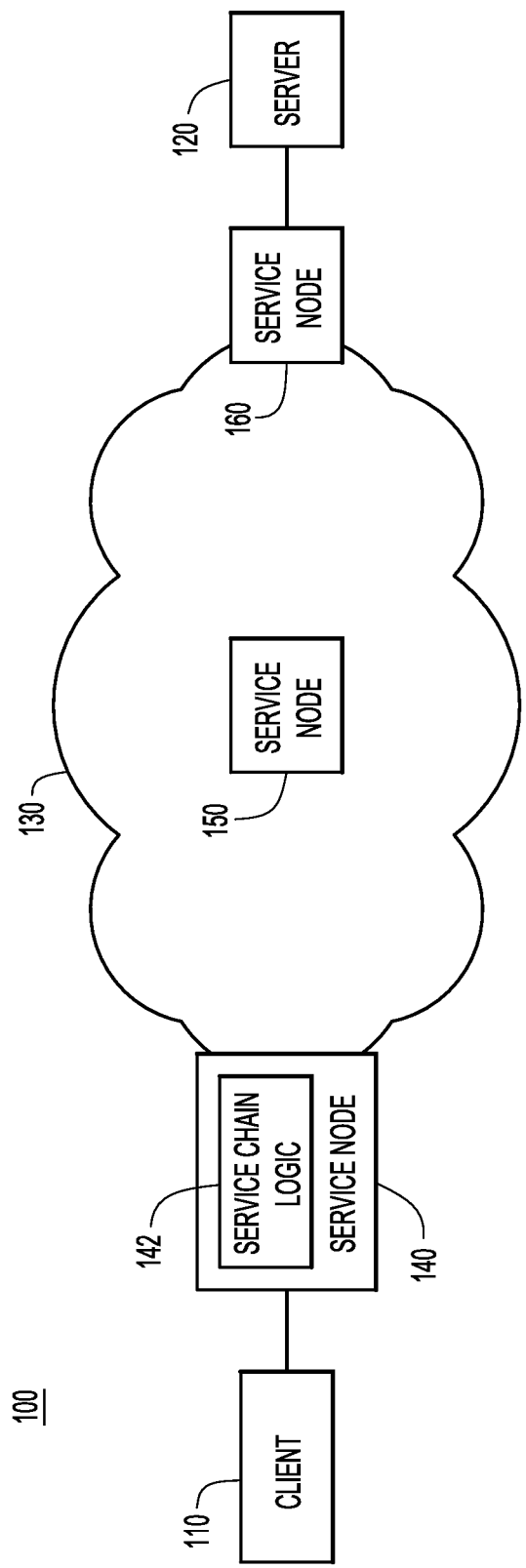
FIG. 1 is a system block diagram showing a plurality of service nodes between an endpoint client and an endpoint server according to an example embodiment.

Referring now to FIG. 1, a simplified block diagram of a network system 100 with a client and server connected by a computer network is shown. System 100 includes a client endpoint device 110 (often referred to simply as "client" or "client device") and a server endpoint device 120 (often referred to simply as "server" or "server device"). The client 110 and server 120 communicate securely with messages over network 130 in encrypted TLS sessions. Within the network 130, service nodes 140, 150, and/or 160 relay network traffic between client 110 and server 120, as well as other endpoints, which are not shown in FIG. 1. Service node 140 is the first service node in network 130 and initiates a service chain with service chain logic 142. Service node 150 is the second service node in the service chain between client 110 and server 120. Service node 160 is the third and final service node in the service chain, after which the traffic is directed to the server 120. There may be numerous more nodes in the service chain and FIG. 1 is only a simplified example.

In one example, the client 110 and server 120 may take a variety of forms, including a desktop computer, laptop computer, server, mobile/cellular phone, tablet computer, Internet telephone, etc. Service nodes 140, 150, and 160 may be, for example, a switch, a router, or a virtual appliance in a variety of types of network 130 (e.g., any combination of Internet, intranet, local area network (LAN), wide area network (WAN), wired network, wireless network, etc.) that connects computing devices, e.g., clients 110 and server 120. Service nodes 140, 150, and 160 may be located in a single location or they may be spread across multiple data centers.

In another example, the client 110 initiates an HTTPS session with the server 120. The session transits a "Cloud-Security-as-a-Service" or Intercloud service that offers multiple services as part of network 130. As part of the Cloud-Security-as-a-Service, the traffic enters a service function chain enabled data center network 130 through a service node 140. The service node 140 may associate a service chain label for some or all of the traffic that enters the network 130. For example, the service node 140 may identify any HTTPS flow and determine the services that need to be applied.

The service node 140 may also generate a network service header with metadata that indicates that a particular flow should be subjected to an HTTPS proxy and that associated keys will be carried forward to subsequent service nodes. Based on the services in the service chain, the associated keys may include encryption keys and Message Authentication Code (MAC) keys. The MAC keys may be omitted if the subsequent services only need to inspect the payload, and do not need to modify the payload. For example, firewall and IDS/IPS services will typically only need to inspect the packets to determine an action to take with the packet. Service nodes that only inspect the packets will not require the MAC keys. However, services such as traffic compression modify the payload of the packets and will require both encryption and MAC keys.

Once traffic in the HTTPS session is classified, service node 140 breaks the TLS session between the client 110 and the server 120 into two TLS sessions. The first session is between the client 110 and the service node 140, and the second session is between the service node 140 and the server 120. As part of the network service header metadata, the service node 140 informs the other service nodes 150 and 160 that they should not act as a TLS proxy and break the TLS session between the service node 140 and the server 120. In one example, the metadata is included in a variable length network service header context header.

After the two TLS sessions have been set up, the service node 140 includes any relevant TLS keys (e.g., encryption/decryption keys, authentication keys, initial values, etc.) into a network service header that is propagated to all of the subsequent service nodes along with the traffic of the session. The TLS related keys, as well as the cipher suite and compression method may be conveyed in a variable length context header in the network service header. The service nodes 150 and 160 may either decrypt or decrypt/modify/re-encrypt the traffic using the keys provided in the network service header to provide one or more of the services in the service chain.

Figure 2:
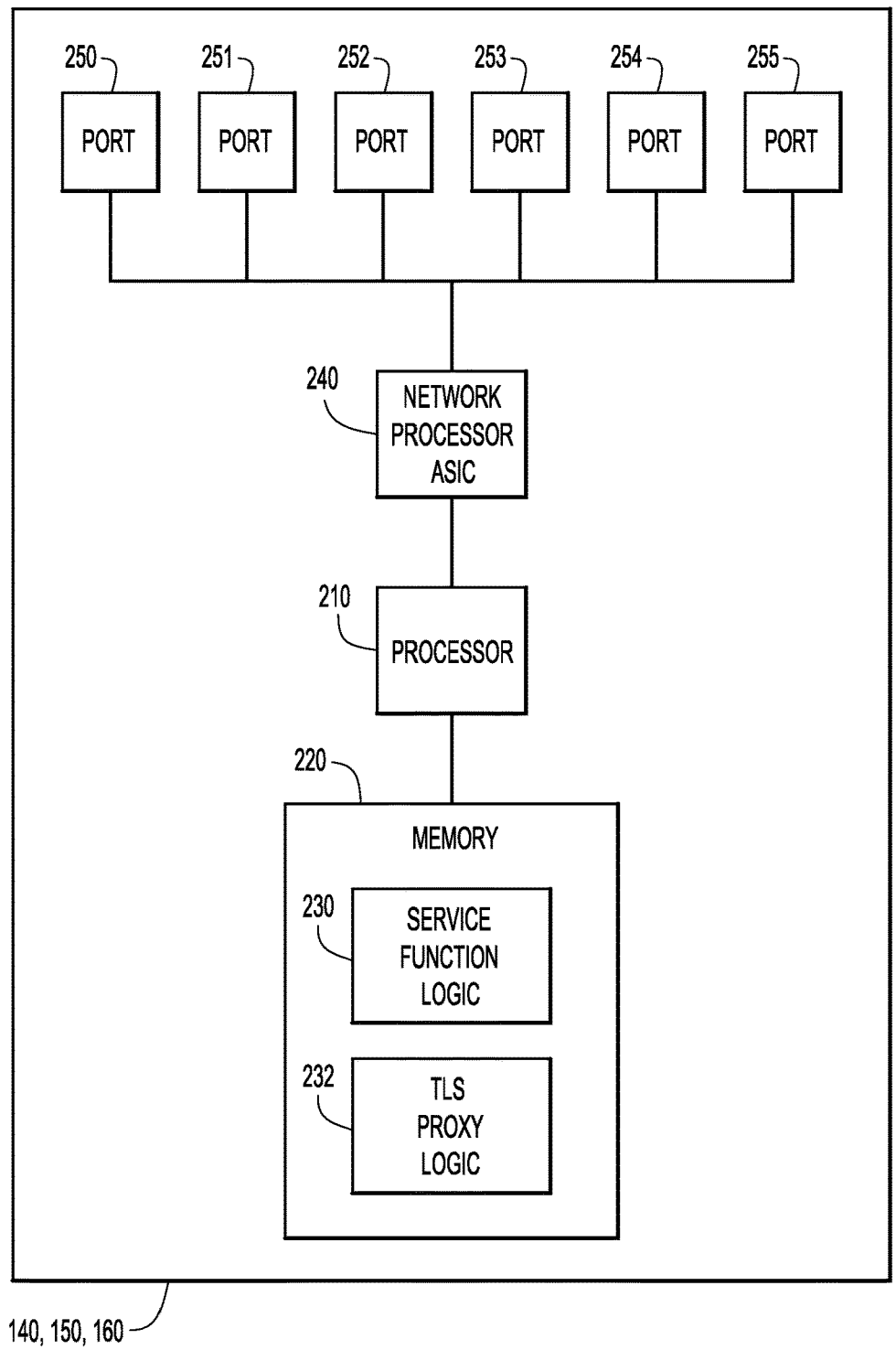
FIG. 2 is a simplified block diagram of service node device according to an example embodiment.

Referring now to FIG. 2, a simplified block diagram of service node 140, 150, or 160 is shown. The service node includes, among other possible components, a processor 210 to process instructions relevant to processing communication packets, and memory 220 to store a variety of data and software instructions (e.g., service function logic 230, TLS Proxy logic 232, communication packets, etc.). The service node also includes a network processor application specific integrated circuit (ASIC) 240 to process communication packets that flow through the network element 120. Network processor ASIC 240 processes communication packets to and from ports 250, 251, 252, 253, 254, and 255. While only six ports are shown in this example, any number of ports may be included in network element 120.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3A:
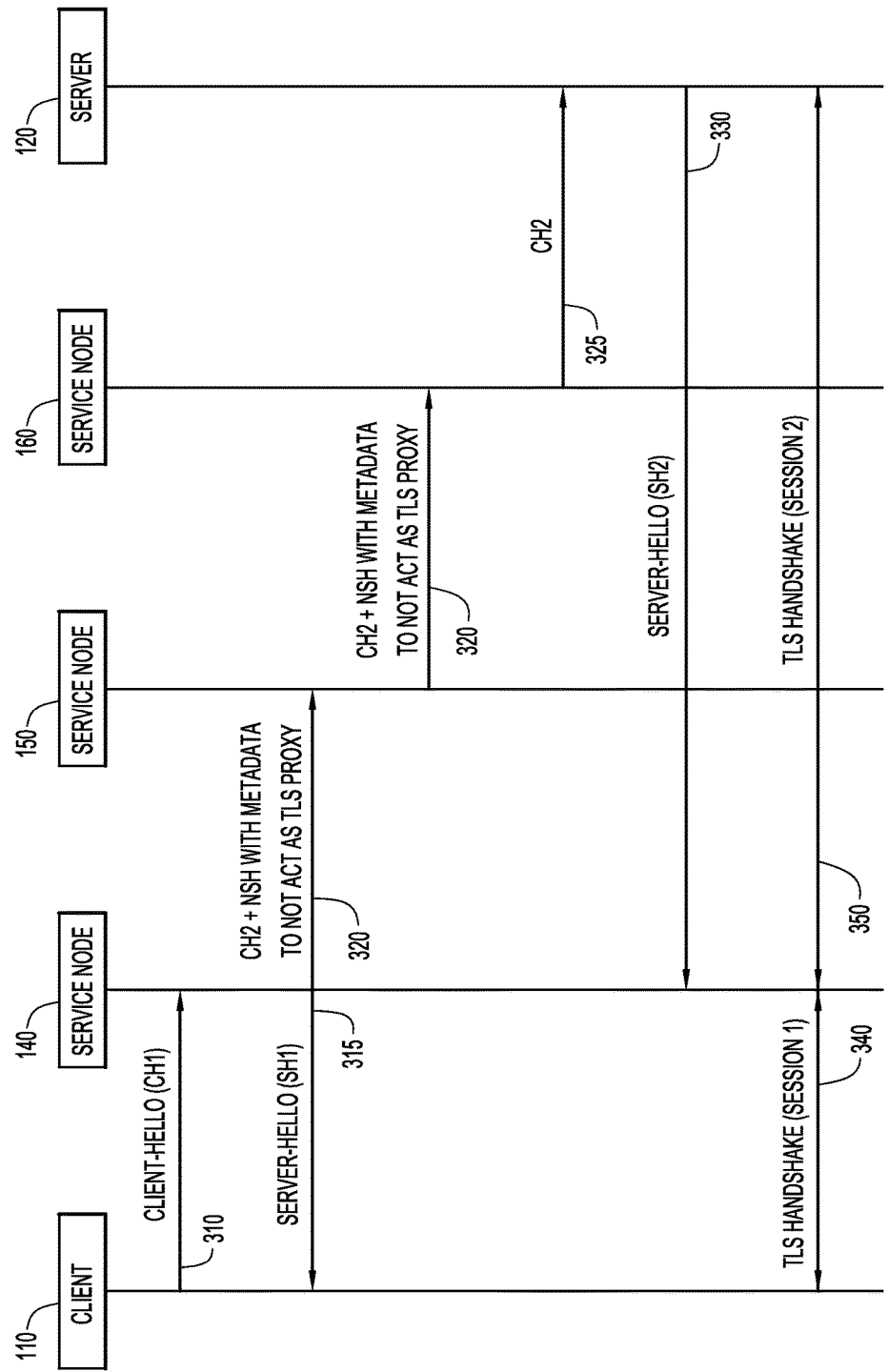
FIG. 3A is a ladder diagram showing steps of initiating a secure TLS session through the service nodes in the service function chain according to an example embodiment.

Referring now to FIG. 3A, a ladder diagram of handshake messages passed in setting up a secure communication session with a service function chain according to an example embodiment is shown. The client 110 initiates the handshake with a Client Hello message 310. The first service node 140 receives the Client Hello message (CH1) from the client 110 and responds with a Server Hello (SH1) message 315 generated by the TLS proxy logic 232 (acting as a proxy server) in the service node 140. The TLS proxy logic 232 (also acting as a proxy client) in service node 140 generates a second Client Hello message (CH2) to initiate a second TLS session. The service node 140 also generates a network service header with metadata indicating that subsequent service nodes are not going to act as TLS proxies. The second Client Hello and the network service header are sent to the next service node 150 in the service chain.

The service node 150 receives the message 320, determines that it will not act as a TLS proxy, and forwards the message 320 to the next service node 160 in the service chain. The service node 160 receives the message 320, and determines that it will not act as a TLS proxy in the messages of this TLS session. The service node 160 also determines that it is the final service node in the service chain and strips out the network service header before forwarding the second Client Hello to the server 120 in message 325. The server 120 responds to the second Client Hello message 325 with a Server Hello message 330 directed to the proxy client function of the TLS proxy logic 232 in service node 140.

The service node 140 finishes the TLS handshake 340 between the client 110 and the proxy server in the service node 140. The service node 140 also completes the TLS handshake 350 between the server 120 and the proxy client function of the TLS proxy logic 232 in service node 140. The TLS handshakes may be completed with, for example, server certificates, Hello Done messages, Client Key Exchange messages, Change Cipher Spec messages, and Finished messages including Message Authentication Codes. After the completion of the TLS handshakes 340 and 350, the two secure TLS sessions are ready for the data phase of the session to begin.

Figure 3B:
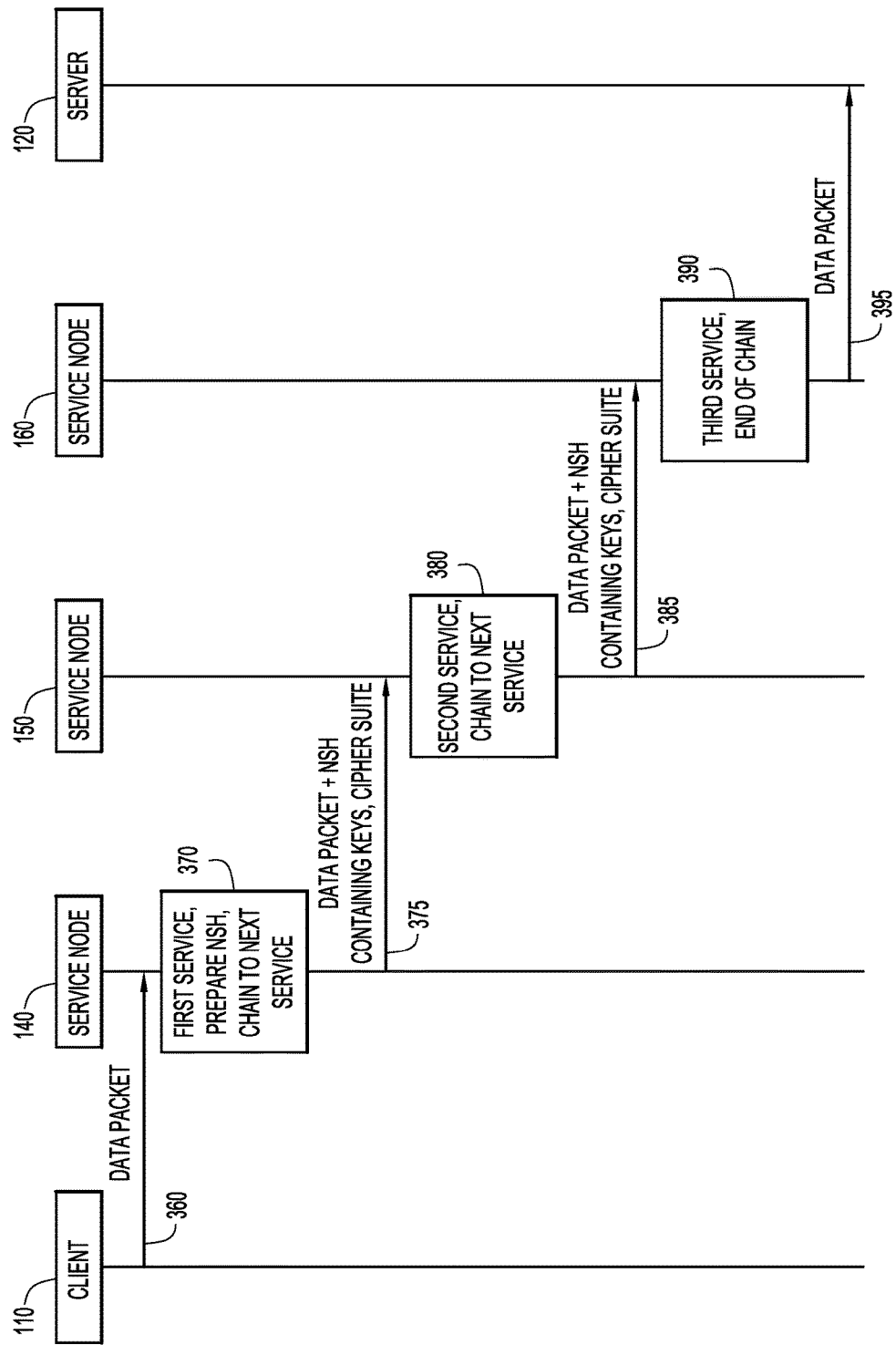
FIG. 3B is a ladder diagram showing steps of processing traffic in a secure TLS session through the service nodes in the service function chain according to an example embodiment.

Referring now to FIG. 3B, a ladder diagram of the data phase in a secure communication session with a service function chain according to an example embodiment is shown. After the TLS handshakes are complete, as shown in FIG. 3A, the client 110 sends a data packet 360 in the first TLS session. The proxy server function of the TLS proxy logic 232 in service node 140 receives the data packet 360 and decrypts the data packet in preparation for the services in the service chain. The service node 140 performs the first service (e.g., a firewall service) at 370 and prepares the data packet to be sent in the second TLS session. The service node 140 also generates a network service header containing cryptographic information (e.g., keys, cipher suite, etc.) for the second TLS session. Assuming the data packet does not get dropped as a result of the service function, the service node 140 sends the data packet, which is encrypted as part of the second TLS session, as well as the network service header, to the next service node 150 in the service chain as message 375.

The second service node 150 receives the message 375 and decrypts the data packet with the cryptographic information provided in the network service header. The service node 150 then provides the second service function (e.g., an IDS/IPS service) at 380 and prepares the data packet to be sent to the next service node in the service chain. The service node 150 sends the data packet and network service header to the next service node 160 in message 385.

The final service node 160 receives the message 385 and decrypts the data packet with the cryptographic information provided in the network service header. The service node 160 provides another service function (e.g. a compression service) at 390. The service node 160 determines that it is the final service node in the service chain and removes the network service header before sending the processed data packet 395 to the server 120.

In another example, one or both of the TLS sessions may be renegotiated, and new cryptographic information may need to be distributed to the service nodes. The new cryptographic information may include a new session key, MAC key, and/or cipher suite. The changes in the cryptographic information will be distributed by the service node 140, which is acting as the proxy in the TLS session, to the other service nodes 150 and 160, which will use the new cryptographic information to perform their respective service functions on the data packets in the renegotiated TLS session. The new cryptographic information may be distributed through the network service header to the other service nodes in the service chain.

While FIGS. 3A and 3B depict three services being provided to the TLS session, the number of services may be higher or lower. Additionally, more or fewer than the three service nodes shown may be used to provide the services. Further, multiple services may be provided at a single service node if the service node has the capability to do so. For example, a firewall service may be provided at service node 140, an IDS/IPS service may be provided at service node 150, and both traffic compression and advertisement insertion may be provided at service node 160.

In a further example, the cryptographic information included in the network service header may be encrypted to avoid a man-in-the-middle attack from gaining access to the keys. The service header may be encrypted using symmetric key(s) established between the service nodes. The symmetric keys may be established prior to receiving the request for the TLS session, or the keys may be established as part of the TLS session setup process.

Figure 4:
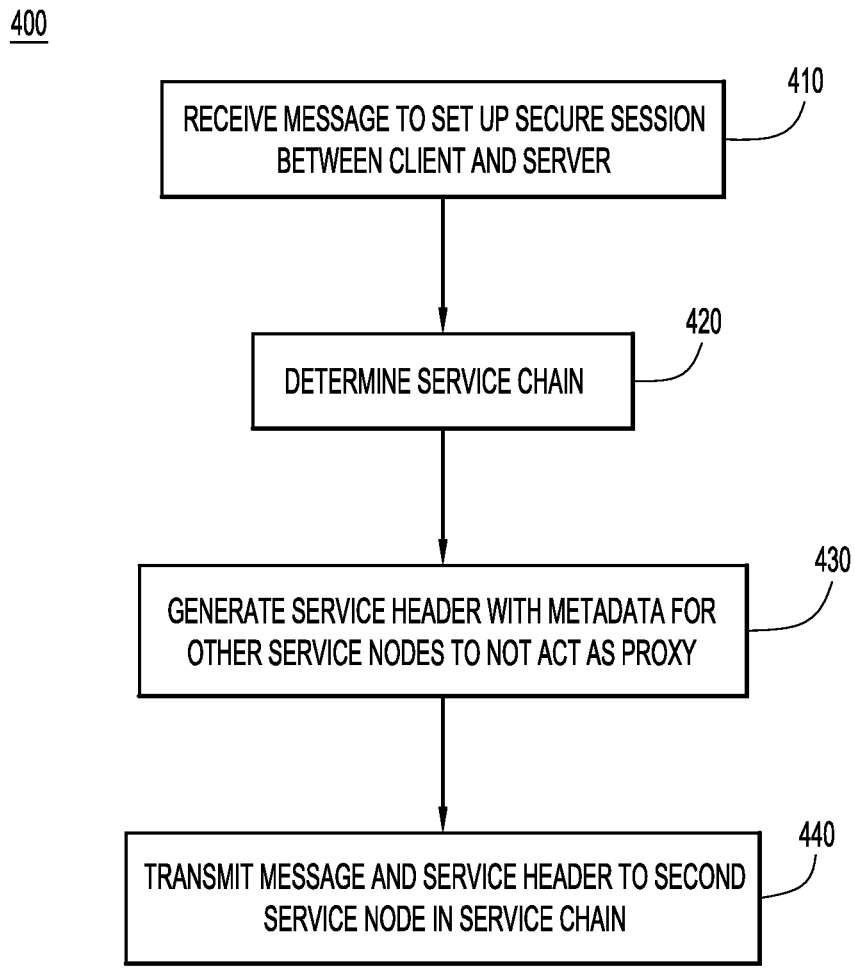
FIG. 4 is a flowchart showing the operations of a service node acting as a proxy according to an example embodiment.

Referring now to FIG. 4, a flow diagram shows a process 400 of operations performed by a service node upon receiving a request to set up a secure session and provide services within the secure session. In step 410, the service node receives a message to set up a secure session between a client and server. The message from the client may be a Client Hello message to initiate a TLS session. To provide services on data traffic encrypted in the secure TLS, the service node acts as a proxy in the TLS session, creating two separate TLS sessions. In step 420, the service node determines a service chain of service nodes that are assigned to perform the requested service functions on the traffic in the secure session.

In step 430, the service node generates a service header including information indicating the service nodes in the service chain, and includes metadata that indicates to the subsequent service nodes that they will not act as proxies in the TLS session. The service node transmits the message (e.g., the Client Hello message) and the service header with the metadata to the second service node listed in the service chain.

Figure 5:
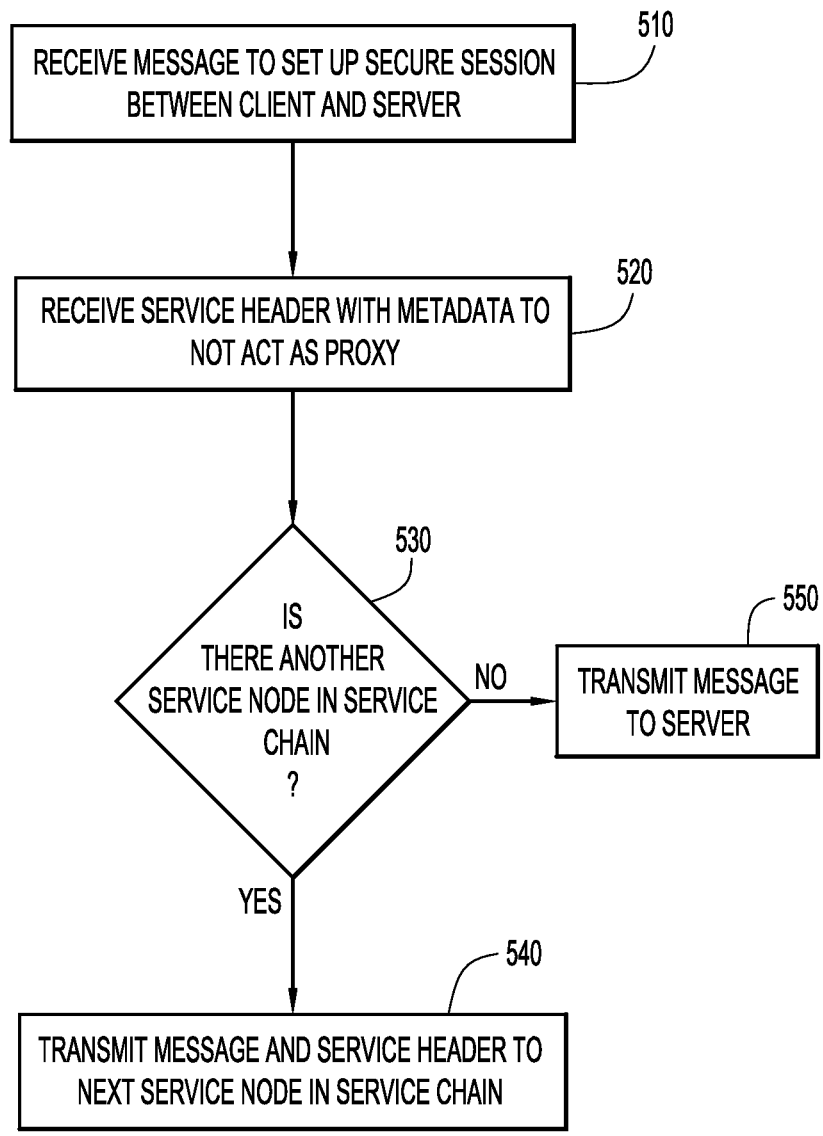
FIG. 5 is a flowchart showing operations of a service that does not act as a proxy according to an example embodiment.

Referring now to FIG. 5, a flow diagram shows a process 500 of operations performed by subsequent service nodes upon receiving a request to set up a secure session and provide services within the secure session. In step 510, the service node receives a message from a previous service node to set up a secure session between a client and a server. In step 520, the service node receives a service header that includes metadata instructing the service node not to act as a proxy in providing services to data in the secure session. Since the service node will not act as a proxy, the service node forwards the request message to the next destination. If there is another service node listed in the service chain, as determined in step 530, then the service node forwards the request message and the service header to the next service node in the service chain at 540. If the service node is the last one in the service chain, then the service node forwards the message without the service header to the server at 550.

In summary, the techniques presented herein avoid the use of multiple TLS proxies when multiple service nodes are assigned to provide services to a secure TLS session. The first service node acts as a TLS proxy and conveys any cryptographic information within the network service header to subsequent service nodes to access the encrypted payloads. While the above mechanism has been described in terms of TLS protocol sessions, it is equally applicable to sessions using other transport layer protocols, such as Quick User Datagram Protocol Internet Connections (QUIC) sessions.

In one example, the techniques presented herein provide for a computer-implemented method comprising receiving at a first service node among a plurality of service nodes, a message configured to set up a secure communication session between a client and a server. The first service node acts as a proxy in the secure communication session. Data packets in the secure communication session are subject to a plurality of service functions. A service chain is determined to comprise an assignment of at least one of the plurality of service nodes to each of the plurality of service functions. A first service header is generated comprising metadata indicating that the service nodes other than the first service node will not act as proxies in the secure communication session. The message and the first service header are transmitted to a second service node in the service chain.

In another example, the techniques presented herein provide for an apparatus with a network interface unit and a processor. The network interface unit is configured to send and receive communications over a network. The processor is configured to receive, via the network interface unit, a message configured to set up a secure communication session between a client and a server, in which the apparatus acts as a proxy in the secure communication session. Data packets in the secure session are subject to a plurality of service functions. The processor determines a service chain comprising an assignment of at least one service node among the plurality of service nodes to each of the plurality of service functions. The processor generates a first service header comprising metadata indicating that the service nodes other than the apparatus will not act as proxies in the secure communication session. The processor transmits, via the network interface unit, the message and the first service header to a next service node in the service chain.

In a further example, the techniques presented herein provide for a computer-implemented method comprising receiving at a service node among a plurality of service nodes, a message configured to set up a secure communication session between a client and a server. Data packets in the secure communication session are subject to a plurality of service functions according to a service chain comprising the plurality of service nodes. A first service header is received comprising metadata indicating that the service node will not act as a proxy in the secure communication session. The message and the first service header are transmitted to a next service node in the service chain.

The above description is intended by way of example only. Various modifications and structural changes may be made therein without departing from the scope of the concepts described herein and within the scope and range of equivalents of the claims.

What is claimed is:

1. A method comprising:
receiving a message at a first service node among a plurality of service nodes, each of the plurality of service nodes including a memory device storing proxy logic and a processor to execute the proxy logic, each of the plurality of service nodes being capable of acting as a proxy in the secure communication session, the message configured to set up a secure communication session between a client and a server and causing the first service node to act as the proxy in the secure communication session, wherein data packets in the secure communication session are subject to a plurality of service functions;
determining a service chain comprising an assignment of at least one of the plurality of service nodes to each of the plurality of service functions;
in response to receipt of the message, generating, by the processor of the first service node, a first service header comprising metadata indicating that the service nodes other than the first service node will not act as proxies in the secure communication session; and
transmitting the message and the first service header to a second service node in the service chain so that the second service node does not act as another proxy in the secure communication session.

2. The method of claim 1, further comprising:
receiving the data packets in the secure communication session;
generating a second service header comprising cryptographic information related to the secure communication session; and
transmitting the data packets in the secure communication session with the second service header to the second service node in the service chain.

3. The method of claim 2, further comprising processing the data packets in the secure communication session with at least one service function among the plurality of service functions.

4. The method of claim 2, wherein the cryptographic information comprises at least one of an encryption key, a decryption key, a Message Authentication Code (MAC) key, or a cipher suite.

5. The method of claim 2, further comprising encrypting the cryptographic information related to the secure communication session in the second service header.

6. The method of claim 1, further comprising dividing the secure communication session into a first session between the client and the first service node and a second session between the first service node and the server.

7. The method of claim 6, further comprising:
receiving the data packets in the secure communication session from the client in the first session;
encrypting cryptographic information related to the second session;
generating a second service header comprising the encrypted cryptographic information; and
transmitting the data packets in the secure communication session with the second service header to the second service node in the service chain.

8. An apparatus comprising:
a network interface unit configured to send and receive communications over a network; and
a processor configured to:
receive, via the network interface unit, a message configured to set up a secure communication session between a client and a server, causing the apparatus to act as a proxy in the secure communication session, wherein data packets in the secure communication session are subject to a plurality of service functions;
determine a service chain comprising an assignment of at least one service node among a plurality of service nodes to each of the plurality of service functions, each of the plurality of service nodes including a memory device storing proxy logic, and being capable of acting as another proxy in the secure communication session;
generate a first service header comprising metadata indicating that the service nodes other than the apparatus will not act as proxies in the secure communication session; and
transmit, via the network interface unit, the message and the first service header to a next service node in the service chain so that the next service node does not act as another proxy in the secure communication session.

9. The apparatus of claim 8, wherein the processor is further configured to:
receive the data packets in the secure communication session via the network interface unit;
generate a second service header comprising cryptographic information related to the secure communication session; and
transmit, via the network interface unit, the data packets in the secure communication session with the second service header to the next service node in the service chain.

10. The apparatus of claim 9, wherein the processor is further configured to process the data packets in the secure communication session with at least one service function among the plurality of service functions.

11. The apparatus of claim 9, wherein the cryptographic information comprises at least one of an encryption key, a decryption key, a Message Authentication Code (MAC) key, or a cipher suite.

12. The apparatus of claim 9, wherein the processor is further configured to encrypt the cryptographic information related to the secure communication session in the second service header.

13. The apparatus of claim 8, wherein the processor is further configured to divide the secure communication session into a first session between the client and the apparatus and a second session between the apparatus and the server.

14. The apparatus of claim 13, wherein the processor is further configured to:

receive, via the network interface unit, the data packets in the secure communication session from the client in the first session;
encrypt cryptographic information related to the second session;
generate a second service header comprising the encrypted cryptographic information; and
transmit, via the network interface unit, the data packets in the secure communication session with the second service header to the next service node in the service chain.

15. A method comprising:
receiving at a service node among a plurality of service nodes, a message configured to set up a secure communication session between a client and a server, each of the service nodes including a memory device storing proxy logic and a processor to execute the proxy logic, and being capable of acting as a proxy in the secure communication session, wherein data packets in the secure communication session are subject to a plurality of service functions according to a service chain comprising the plurality of service nodes;
receiving a first service header comprising metadata indicating that the service node will not act as another proxy in the secure communication session;
in response to receipt of the first service header, determining, by the service node, that the service node is not another proxy in the service chain; and
transmitting the message and the first service header to a next service node in the service chain so that the next service node does not act as another proxy in the secure communication session.

16. The method of claim 15, further comprising:
receiving the data packets in the secure communication session;
receiving a second service header comprising cryptographic information related to the secure communication session;
decrypting the data packets with the cryptographic information; and
processing the decrypted data packets with at least one service function among the plurality of service functions.

17. The method of claim 16, further comprising transmitting the data packets which have been processed and the second service header to the next service node in the service chain.

18. The method of claim 16, further comprising:
re-encrypting the decrypted data packets that have been processed with the at least one service function; and
transmitting the re-encrypted data packets and the second service header to the next service node in the service chain.

19. The method of claim 16, wherein the cryptographic information comprises at least one of an encryption key, a decryption key, a Message Authentication Code (MAC) key, or a cipher suite.

20. The method of claim 16, further comprising encrypting the cryptographic information related to the secure communication session in the second service header.

* * * * *